US008946310B2

(12) United States Patent
Glos et al.

(10) Patent No.: US 8,946,310 B2
(45) Date of Patent: Feb. 3, 2015

(54) COMPOSITION CONTAINING SPECIFIC AMIDES AND ORGANOMODIFIED SILOXANES, SUITABLE FOR PRODUCING POLYURETHANE FOAMS

(75) Inventors: Martin Glos, Borken (DE); Carsten Schiller, Muelheim an der Ruhr (DE); Christian Eilbracht, Herne (DE)

(73) Assignee: Evonik Degussa GmbH, Essen (DE)

( * ) Notice: Subject to any disclaimer, the term of this patent is extended or adjusted under 35 U.S.C. 154(b) by 372 days.

(21) Appl. No.: 13/447,810

(22) Filed: Apr. 16, 2012

(65) Prior Publication Data
US 2012/0261605 A1   Oct. 18, 2012

(30) Foreign Application Priority Data
Apr. 15, 2011   (DE) .......................... 10 2011 007 479

(51) Int. Cl.
| C08J 9/228 | (2006.01) |
| C08K 5/20 | (2006.01) |
| C08K 5/5419 | (2006.01) |
| C08J 9/14 | (2006.01) |
| C08G 18/38 | (2006.01) |
| C08G 18/16 | (2006.01) |
| C08G 101/00 | (2006.01) |

(52) U.S. Cl.
CPC .............. *C08J 9/141* (2013.01); *C08G 18/3825* (2013.01); *C08G 18/163* (2013.01); *C08G 2101/0025* (2013.01); *C08J 2375/04* (2013.01); *C08G 2105/02* (2013.01)
USPC .......................................... 521/112; 524/728

(58) Field of Classification Search
None
See application file for complete search history.

(56) References Cited

U.S. PATENT DOCUMENTS

| 3,346,517 | A | * | 10/1967 | Kamal ........................... 521/167 |
| 3,578,612 | A | * | 5/1971 | Burba et al. ..................... 521/167 |
| 3,629,308 | A | * | 12/1971 | Bailey et al. .................... 556/445 |
| 3,637,539 | A | | 1/1972 | Wolff et al. |
| 3,637,540 | A | | 1/1972 | Wolff et al. |
| 3,933,695 | A | | 1/1976 | Omietanski et al. |
| 4,042,540 | A | | 8/1977 | Lammerting et al. |
| 4,100,116 | A | * | 7/1978 | Mazanek et al. ............... 521/167 |
| 4,107,102 | A | * | 8/1978 | Dahm et al. .................... 521/163 |
| 4,147,847 | A | | 4/1979 | Schweiger |
| 4,237,237 | A | * | 12/1980 | Jarre et al. ..................... 521/128 |
| 4,246,364 | A | * | 1/1981 | Koehler et al. ................ 521/167 |
| 4,288,566 | A | * | 9/1981 | Muller et al. .................. 521/158 |
| 4,331,778 | A | * | 5/1982 | Sommerfeld et al. ......... 521/129 |
| 4,444,916 | A | * | 4/1984 | Grube et al. ................... 521/131 |
| 4,546,116 | A | * | 10/1985 | Muller et al. .................. 521/106 |
| 4,615,822 | A | * | 10/1986 | Magnus .................... 252/182.25 |
| 4,722,942 | A | * | 2/1988 | Nichols et al. ................ 521/110 |
| 4,764,540 | A | * | 8/1988 | Dewhurst et al. ............. 521/110 |
| 4,797,428 | A | * | 1/1989 | Reichmann .................... 521/137 |
| 4,855,379 | A | | 8/1989 | Budnik et al. |
| 5,236,961 | A | | 8/1993 | Ho et al. |
| 5,306,737 | A | | 4/1994 | Burkhart et al. |
| 5,321,051 | A | | 6/1994 | Burkhart et al. |
| 5,357,018 | A | | 10/1994 | Burkhart et al. |
| 5,990,187 | A | | 11/1999 | Boinowitz et al. |
| 6,359,022 | B1 | | 3/2002 | Hickey et al. |
| 6,403,545 | B1 | * | 6/2002 | Karls et al. ..................... 510/181 |
| 7,671,103 | B2 | | 3/2010 | Eilbracht et al. |
| 7,671,104 | B2 | | 3/2010 | Heinemann et al. |
| 7,829,647 | B2 | | 11/2010 | Brueckner et al. |
| 7,838,566 | B2 | | 11/2010 | Glos et al. |
| 8,030,366 | B2 | | 10/2011 | Ferenz et al. |
| 2002/0103091 | A1 | | 8/2002 | Kodali |
| 2005/0165122 | A1 | * | 7/2005 | Braun et al. ...................... 521/50 |
| 2007/0021581 | A1 | | 1/2007 | Eilbracht et al. |
| 2007/0072951 | A1 | | 3/2007 | Bender et al. |
| 2007/0123599 | A1 | | 5/2007 | Eilbracht et al. |
| 2007/0238800 | A1 | | 10/2007 | Neal et al. |
| 2007/0270518 | A1 | | 11/2007 | Nutzel |
| 2007/0282026 | A1 | | 12/2007 | Grigsby, Jr. et al. |
| 2008/0125503 | A1 | | 5/2008 | Henning et al. |
| 2008/0146688 | A1 | | 6/2008 | Glos et al. |
| 2008/0234402 | A1 | | 9/2008 | Lehmann et al. |
| 2009/0088488 | A1 | | 4/2009 | Bruckner et al. |
| 2010/0029587 | A1 | | 2/2010 | Brueckner et al. |
| 2010/0036011 | A1 | | 2/2010 | De Gans et al. |
| 2010/0071849 | A1 | | 3/2010 | Knott et al. |
| 2010/0113633 | A1 | | 5/2010 | Henning et al. |
| 2010/0240786 | A1 | | 9/2010 | Glos et al. |

(Continued)

FOREIGN PATENT DOCUMENTS

| DE | 1745443 | 5/1957 |
| DE | 1745459 | 5/1957 |

(Continued)

OTHER PUBLICATIONS

European Search Report dated Sep. 3, 2012 in a corresponding foreign application.
"Ullmann's Encyclopedia of Industrial Chemistry", vol. A21, VCH, Weinheim, 4th edition 1992, pp. 665 to 715.
Houben-Weyl, "Methoden der organischen Chemie", vol. E20, Thieme Verlag, Stuttgart 1987,(3), pp. 1561 to 1757.

*Primary Examiner* — Robert S Loewe
(74) *Attorney, Agent, or Firm* — Scully, Scott, Murphy & Presser, P.C.

(57) ABSTRACT

Compositions suitable for producing polyurethane foams which include at least a polyol component, a catalyst catalyzing the formation of a urethane or isocyanurate bond, optionally a blowing agent, optionally further additives and optionally an isocyanate component, which are characterized in that they additionally include an admixture including at least one specific amide and at least one siloxane compound, wherein the mass ratio of siloxane compounds to compounds of formula (I) is above 1:10.

12 Claims, No Drawings

(56) References Cited

U.S. PATENT DOCUMENTS

| | | |
|---|---|---|
| 2010/0292357 A1 | 11/2010 | Knott et al. |
| 2010/0294982 A1 | 11/2010 | Schiller et al. |
| 2010/0298455 A1 | 11/2010 | Henning et al. |
| 2011/0028578 A1 | 2/2011 | Glos |
| 2011/0034576 A1 | 2/2011 | Henning et al. |
| 2011/0054055 A1 | 3/2011 | Schmitz et al. |
| 2011/0062370 A1 | 3/2011 | Eilbracht et al. |
| 2011/0257280 A1 | 10/2011 | Glos et al. |
| 2011/0306694 A1 | 12/2011 | Glos et al. |
| 2013/0065998 A1* | 3/2013 | Lai et al. ............... 524/265 |

FOREIGN PATENT DOCUMENTS

| | | |
|---|---|---|
| DE | 1802500 | 12/1959 |
| DE | 1802503 | 12/1959 |
| DE | 2533074 | 3/1976 |
| DE | 4229402 A1 | 3/1994 |
| DE | 4239054 A1 | 5/1994 |
| DE | 102004001408 A1 | 7/2005 |
| EP | 0043110 | 1/1982 |
| EP | 0048984 | 4/1982 |
| EP | 0493836 A1 | 7/1992 |
| EP | 0533202 A1 | 3/1993 |
| EP | 0672697 A1 | 9/1995 |
| EP | 0734404 | 10/1996 |
| EP | 0767199 A1 | 4/1997 |
| EP | 0780414 A2 | 6/1997 |
| EP | 0839852 A2 | 5/1998 |
| EP | 0656382 B1 | 8/1998 |
| EP | 0867464 A1 | 9/1998 |
| EP | 1161474 A0 | 12/2001 |
| EP | 1537159 A0 | 6/2005 |
| EP | 1544235 A1 | 6/2005 |
| EP | 1678232 A0 | 7/2006 |
| EP | 1712578 A1 | 10/2006 |
| EP | 1873209 A2 | 1/2008 |
| EP | 1977825 A1 | 10/2008 |
| EP | 1985642 | 10/2008 |
| EP | 1985644 A1 | 10/2008 |
| GB | 1247671 | 9/1971 |
| WO | WO9516721 | 6/1995 |
| WO | WO9612759 | 5/1996 |
| WO | WO0047647 | 8/2000 |
| WO | WO2004020497 A1 | 3/2004 |
| WO | WO2004096882 A1 | 11/2004 |
| WO | WO2005008383 A2 | 1/2005 |
| WO | WO2005033167 A2 | 4/2005 |
| WO | WO2005085310 A2 | 9/2005 |
| WO | WO2005118668 | 12/2005 |
| WO | WO2006094227 A2 | 9/2006 |
| WO | WO2006116456 A1 | 11/2006 |
| WO | WO2007019063 | 2/2007 |
| WO | WO2007111828 A2 | 10/2007 |

* cited by examiner

COMPOSITION CONTAINING SPECIFIC AMIDES AND ORGANOMODIFIED SILOXANES, SUITABLE FOR PRODUCING POLYURETHANE FOAMS

FIELD OF THE INVENTION

The present invention relates to compositions suitable for producing polyurethane foams comprising at least a polyol component, a catalyst catalyzing the formation of a urethane or isocyanurate bond, and an admixture including at least one specific amide and at least one siloxane compound. The present invention also relates to a process for producing foamed polyurethane or polyisocyanurate materials, more particularly rigid foams, the use of the foamed materials, more particularly as insulation materials, and also the insulation materials themselves.

BACKGROUND

The production of foams based on polyols and isocyanates frequently utilizes cell- and foam-stabilizing additives to ensure a uniform and low-defect foam structure and hence to exert a substantially positive influence on the performance characteristics of the foamed material. Surfactants based on organically modified siloxanes are particularly effective and therefore represent a preferred type of foam stabilizer.

When these siloxanes are added in the course of the foaming process, the siloxanes are not only in pure form, but in the form of admixtures with further non-silicon-containing components. This can serve to improve meterability, since the amounts of siloxane to be added to the mixture to be foamed are often very small. In addition, the admixed component can also improve the solubility of siloxanes in the polyol mixture and hence additionally influence the foaming process and the foam properties.

It can be advantageous for the admixed component to also have surfactant properties that exert a positive influence on the foam properties. Recent demand has been for producing polyurethane foams that contain very small amounts of siloxane foam stabilizers, or even no siloxane foam stabilizers.

Various foam stabilizers and/or admixed components are known from the prior art:

EP 0839852 A2 describes the production of polyurethane foam using siloxanes in admixtures with vegetable oils consisting of different triglycerides. The oils however do not appear to have any influence on foam quality.

German Applications DE 1802500 and DE 1802503 describe alkanolamides obtained, for example, by reaction of diethanolamine with natural fatty acids or naturally occurring glycerides, and their use as a polyol component in the production of polyurethane foams. The description mentions the possibility that the use of siloxane surfactants can be dispensed with. In the aforementioned German Publications, the amides are used as the polyol component and thus constitute an appreciable part of the formulation. Foam production in the examples utilizes silicones as a stabilizing additive, which are used in fractions of below 5% based on the amide.

Similarly, German Applications DE 1745443 and DE 1745459, and U.S. Pat. No. 3,578,612 describe alkanolamides of polymeric fatty acid or alkoxylates thereof which are used as a polyol component for producing polyurethane foams. The foaming process always includes a siloxane stabilizer in small amounts (below 5% based on the amide).

EP 0767199 describes the use of soya-based diethanolamide for improving pentane solubility. Commercially available siloxanes are used as a stabilizer in the foaming process. The fractions of diethanolamide are at least 20 times higher than the fractions of siloxane. Hence the siloxane fraction is below 5% based on the amide.

U.S. Pat. No. 3,629,308 describes butanol-started polyethers useful as an admixed component for organosiloxanes.

EP 0048984 B1 describes admixtures of siloxanes with various water-soluble surfactants for use in a polyester-polyurethane foam. The surfactants mentioned in the aforementioned European publication are often poorly biodegradable.

EP 0043110 A1 describes admixtures of siloxanes with solvents such as, for example, alkoxylates onto glycerol, water, TMP, butanol or nonylphenol for use in a high-resilience polyurethane foam.

U.S. Pat. No. 5,236,961 describes the production of polyurethane foams using alkylphenol ethoxylates as foam stabilizers. The alkylphenol ethoxylates disclosed in the '961 patent originate from petrochemical sources.

EP 0734404 describes the production of polyurethane (PU) foams using polyalkylene oxides, wherein the polyalkylene oxides are constructed using 10-90% of butylene oxide.

Many of the foam stabilizers described in the prior art, more particularly those based on silicon, and/or their admixed components are notable for unfavorable toxicity, poor biodegradability or sensitivity to hydrolysis.

The use of polyurethane foams as insulation materials especially requires such polyurethane foams to have a small coefficient of thermal conductivity (lambda value).

SUMMARY

The present invention provides polyurethane foams that do not have one or more of the abovementioned disadvantages. More particularly, the present invention provides polyurethane foams that have a small coefficient of thermal conductivity.

The above are achieved surprisingly, by using, in the production of polyurethane foams, compositions containing an admixture including at least one specific amide and at least one siloxane compound, wherein the mass ratio of siloxane compounds to compounds of formula (I) (in the admixture) is above 1:10.

The present invention accordingly provides a composition suitable for producing polyurethane foams. The inventive composition comprises at least a polyol component, a catalyst catalyzing the formation of a urethane or isocyanurate bond, and an admixture comprising at least one amide of formula (I)

and at least one siloxane compound, wherein the mass ratio of the at least one siloxane compound to the at least one amide of formula (I) is above 1:10, preferably above 1:5, more preferably not less than 1:1 and even more preferably in the range from 1:1 to 5:1.

In one embodiment of the present invention, the composition further comprises a blowing agent. In another embodiment, the composition further comprises additional additives. In a further embodiment, the composition further includes an isocyanate component. In yet another embodiment, the composition may comprise any combination of a blowing agent, additional additives and an isocyanate component.

The present invention also provides a process for producing foamed polyurethane or polyisocyanurate materials (polyurethane foams) by reacting the inventive composition.

The present invention further provides polyurethane foams containing at least one amide compound according to formula (I) and at least one siloxane compound, which are preferably obtainable by the inventive process. The polyurethane foams that are provided have a low coefficient of thermal conductivity.

The present invention even further provides for the use of the inventive polyurethane foams as, or for producing insulating materials, preferably insulating panels, refrigerators, insulating foams, vehicle seats, more particularly auto seats, roof liners, mattresses, filtering foams, packaging foams or spray foams, and also refrigerating apparatuses including an inventive polyurethane foam as an insulating material.

Because of the low coefficient of thermal conductivity, the polyurethane foams of the present disclosure which include the inventive composition have a particularly good thermal insulation performance.

A further advantage of using the inventive compositions is that they can be used universally with (almost) all known blowing agents.

Using the inventive composition also has the advantage of providing polyurethane foams having a particularly good surface (few defects in the surface). This helps to optimize the energy efficiency of refrigerating equipment as well as to manufacture aesthetically pleasing refrigerating equipment with shiny metallic facing layers using metallic facing layers of low thickness. A defective foam can engender corresponding losses in quality, which can become visible as dents in the metallic facing layer for example.

The admixtures used according to the present invention also have the advantage that they lead to a better solubility of pentane, a widely used blowing agent, as a result of which more blowing agent can be added to the corresponding compositions for foam production, and the clouding tendency of the compositions decreases.

A further advantage of using the admixture according to the present invention is that the amide compounds included therein can be largely based on renewable resources.

DETAILED DESCRIPTION

The present invention will now be described by way of example without any intention to restrict the invention to these exemplary embodiments. Where ranges, general formulae or classes of compounds are indicated in what follows, they shall encompass not just the corresponding ranges or groups of compounds that are explicitly mentioned, but also all sub-ranges and sub-groups of compounds which are obtainable by extraction of individual values (ranges) or compounds. Where documents are cited in the context of the present description, their content shall fully belong to the disclosure content of the present invention particularly in respect of the factual position in the context of which the document was cited. Percentages are by weight, unless otherwise stated. Average values indicated in what follows are weight averages, unless otherwise stated. When parameters which were determined by measurement are indicated in what follows, the measurements, unless otherwise stated, were carried out at a temperature of 25° C. and a pressure of 101 325 Pa.

In the context of the present disclosure, a polyurethane foam (PU foam) refers to a foam obtained as a reaction product based on isocyanates and polyols or compounds having isocyanate-reactive groups. In the course of the reaction to form the eponymous polyurethane, further functional groups can also be formed, examples include allophanates, biurets, ureas or isocyanurates. Therefore, PU foams within the meaning of the present invention include not only polyurethane foams (PUR foams), but also polyisocyanurate foams (PIR foams). Rigid polyurethane foams are preferred polyurethane foams.

The inventive composition suitable for producing polyurethane foams, more particularly rigid polyurethane foams, comprises at least a polyol component, a catalyst catalyzing the formation of a urethane or isocyanurate bond, and an admixture comprising at least one amide of formula (I)

(I)

where
R is an m-valent organic radical, preferably a hydrocarbon radical, and more preferably a hydrocarbon radical having 1 to 30 carbon atoms, and preferably having 8 to 20 carbon atoms when m=1 and 1 to 7 and preferably 2 to 6 carbon atoms when m=2 or 3, even more preferably a saturated hydrocarbon radical,
R' in each occurrence is the same or different and represents H or an organic radical, preferably $C_1$-$C_{12}$ alkyl, aryl or alkylaryl, which may optionally include oxygen or nitrogen atoms, more particularly hydroxyl or amino groups, or a —X—Z radical, m=1 to 5, preferably m=1, 2 or 3,
Z in each occurrence is the same or different and represents OH or NHR", where R"=H or alkyl, more particularly alkyl having 1 to 30 carbon atoms, preferably H, and
X in each occurrence is the same or different and represents a divalent organic radical having at least two carbon atoms, preferably a hydrocarbon radical, preferably a —$(CH_2)_w$— radical where w=2 to 5 and more preferably an ethylene radical, and at least one siloxane compound, where the mass ratio of the at least one siloxane compound to the at least one amide of formula (I) is above 1:10, preferably not less than 1:4, more preferably above 1:5, even more preferably not less than 1:1 and yet even more preferably in the range from 1:1 to 5:1 and more particularly in the range from 1:1 to 4:1. The amide of formula (I) is preferably based on a fatty acid and an alkanolamine.

In one embodiment of the present invention, the composition further comprises a blowing agent. In another embodiment, the composition further comprises additional additives. In a further embodiment, the composition further includes an isocyanate component. In yet another embodiment, the composition may comprise any combination of a blowing agent, additional additives and an isocyanate component.

Suitable amides of formula (I) are obtainable by reaction of alkanolamines with carboxylic acids, preferably fatty acids or fatty acid esters, for example.

The acid amides are obtainable according to processes known in the prior art, including, for example, those described in DE 1802500, DE 1802503, DE 1745443, DE 1745459 and U.S. Pat. No. 3,578,612. The corresponding carboxylic acids can be used as raw materials, for example, and amide formation can take place by detachment of water.

Carboxylic esters, such as methyl esters for example, can similarly be used, in which case methanol is then detached. It is particularly preferable to use glycerides of naturally occurring fats and oils because the glycerol formed in the course of the amidation can remain in the reaction mixture. Similarly, when triglycerides are reacted with amines, for example, di- and monoglycerides can additionally be present in the reaction mixture provided the reaction conditions are chosen appropriately. When carboxylic esters are used, corresponding catalysts such as alkoxides, for example, are optionally used to provide an amidation at relatively mild conditions compared with the abovementioned detachment of water. When higher-functional amines (DETA, AEEA, TRIS) are used, the preparation of the amides may also lead to the formation of corresponding cyclic amides such as imidazolines or oxazolines.

When a basic catalyst is used in the amidation, it can be advantageous to perform a subsequent neutralization with an appropriate amount of organic or inorganic acid. Suitable compounds are known to a person skilled in the art.

It is particularly preferable for the amides formed by basic catalysis to be neutralized with organic anhydrides of dicarboxylic acids, since these are able to react with the available OH- or NH-functions and thereby converted in a bonded state, and thus, later in the final foam, cannot be emitted in the form of free carboxylic acids. Moreover, when alkali metal alkoxides are used, for example, corresponding esters are formed in the neutralization, and so the free alcohols cannot escape from the system.

Preferred organic anhydrides are cyclic anhydrides such as, for example, succinic anhydride, maleic anhydride, alkylsuccinic anhydrides, such as dodecylsuccinic anhydride or polyisobutylenesuccinic anhydride, similarly suitable are adducts of maleic anhydride onto corresponding polyolefins such as, for example, polybutadienes, copolymers of maleic anhydride and olefins, styrene-maleic anhydride copolymers, vinyl ether-maleic anhydride copolymers, and also generally copolymers which contain maleic anhydride as a monomer, phthalic anhydride, benzophenonetetracarboxylic dianhydride, pyromellitic dianhydride, itaconic anhydride or similar structures. Examples of commercially available anhydrides of this type are, e.g., the Poylvest® types from Evonik Degussa GmbH or Ricon® MA types from Sartomer.

All the reaction steps can be carried out without a solvent or alternatively in suitable solvents. When solvents are used, the active content can be in the range from 10 to 99% by mass, preferably 20 to 98% by mass, and more preferably 30 to 97% by mass based on the overall composition.

Carboxylic Acids:

Monocarboxylic acids, dicarboxylic acids, tricarboxylic acids, tetracarboxylic acids based on aliphatic or aromatic hydrocarbons or derivatives thereof can be used to prepare the amides of formula (I) for example.

Examples of alkyl radicals for monocarboxylic acids are: methyl, ethyl, propyl, butyl, pentyl, hexyl, heptyl, octyl, nonyl or decyl, and the like. In one embodiment, 2-ethylhexanoic acid, nonanoic acid, isononanoic acid are employed as the monocarboxylic acids.

Examples of alkenyl groups include: ethenyl, propenyl, butenyl, pentenyl, hexenyl, heptenyl, octenyl, nonenyl, decenyl and the like.

Examples for aromatic acids include: aryl and alkylaryl (alkylaryl is defined as an aryl-substituted alkyl or arylalkyl group), such as for example: phenyl, alkyl-substituted phenyl, naphthyl, alkyl-substituted naphthyl, tolyl, benzyl, dimethylphenyl, trimethylphenyl, phenylethyl, phenylpropyl, phenylbutyl, propyl-2-phenylethyl, salicyl and the like.

Aromatic dicarboxylic acids can be for example: isophthalic acid, terephthalic acid or phthalic acid. Illustrative of useful aliphatic dicarboxylic acids are: succinic acid, malonic acid, adipic acid, dodecanedicarboxylic acid, maleic acid, fumaric acid, itaconic acid, citraconic acid, mesaconic acid, tartaric acid, malic acid, malonic acid, glutaric acid, adipic acid, pimelic acid, suberic acid, azelaic acid, sebacic acid, and citric acid.

Illustrative of useful higher-functional acids are: trimesic acid, pyromellitic acid, and benzophenonetetracarboxylic acid.

Preferred acids are straight-chain saturated or unsaturated fatty acids having up to 40 carbon atoms such as, for example, butyric acid (butanoic acid), caproic acid (hexanoic acid), caprylic acid (octanoic acid), capric acid (decanoic acid), lauric acid (dodecanoic acid), myristic acid (tetradecanoic acid), palmitic acid (hexadecanoic acid), stearic acid (octadecanoic acid), arachidic acid (eicosanoic acid), behenic acid (docosanoic acid), lignoceric acid (tetracosanoic acid), palmitoleic acid ((Z)-9-hexadecenoic acid), oleic acid ((Z)-9-hexadecenoic acid), elaidic acid ((E)-9-octadecenoic acid), cis-vaccenic acid ((Z)-11-octadecenoic acid), linoleic acid ((9Z,12Z)-9,12-octadecadienoic acid), alpha-linolenic acid ((9Z,12Z,15Z)-9,12,15-octadecatrienoic acid), gamma-linolenic acid ((6Z,9Z,12Z)-6,9,12-octadecatrienoic acid), di-homo-gamma-linolenic acid ((8Z,11Z,14Z)-8,11,14-eicosatrienoic acid), arachidonic acid ((5Z,8Z,11Z,14Z)-5,8,11,14-eicosatetraenoic acid), erucic acid ((Z)-13-docosenoic acid), nervonic acid ((Z)-15-tetracosenoic acid), ricinoleic acid, hydroxystearic acid and undecenylic acid, and also mixtures thereof, for example rapeseed oil acid, soya fatty acid, sunflower fatty acid, peanut fatty acid and tall oil fatty acid. It is further possible to use dimer and oligomeric fatty acids as formed in the oligomerization of unsaturated fatty acids.

Sources of suitable fatty acids or fatty acid esters particularly glycerides can be vegetable or animal fats, oils or waxes. In one embodiment, the following sources can be used: dripping, beef tallow, goose fat, duck fat, chicken fat, horse fat, whale oil, fish oil, palm oil, olive oil, avocado oil, seed kernel oils, coconut oil, palm kernel oil, cocoa butter, cottonseed oil, pumpkin seed oil, maize germ oil, sunflower oil, wheat germ oil, grape seed oil, sesame oil, linseed oil, soya bean oil, peanut oil, lupene oil, rapeseed oil, mustard oil, castor oil, jatropha oil, walnut oil, jojoba oil, lecithin e.g. based on soya, rapeseed or sunflowers, bone oil, neat's-foot oil, borage oil, lanolin, emu oil, deer tallow, marmoset oil, mink oil, borage oil, thistle oil, hemp oil, pumpkin oil, evening primrose oil, tall oil, and also carnauba wax, bees wax, candelilla wax, ouricury wax, sugar cane wax, retamo wax, caranday wax, raffia wax, esparto wax, alfalfa wax, bamboo wax, hemp wax, Douglas fir wax, cork wax, sisal wax, flax wax, cotton wax, dammar wax, tea wax, coffee wax, rice wax, oleander wax, bees wax or wool wax.

Amines:

Amines are suitable that have at least one primary or secondary amine function for amidation and optionally have one or more hydroxyl groups. Suitable amines that can be used in the present invention are for example: ethylenediamine, diethylenetriamine (DETA), triethylenetetramine (TETA), tetraethylenepentamine (TEPA), dipropylenetriamine, tripropylenetetramine, tetrapropylenepentamine, pentapropylenehexamine, hexapropyleneheptamine, and also higher homologs based on ethylenediamine or propylenediamine, 1,2-propylenediamine, 4,4'-diaminodicyclohexylmethane, 3,3'-dimethyl-4,4'-diaminodicyclohexylmethane, 4,4-methylenediphenylenediamine, isophoronediamine, trimethylhexylmethylenediamine, neopentanediamine, octamethylenediamine, polyether-amines such as Polyetheramin D 2000 (BASF), Polyetheramin D 230 (BASF), Polyetheramin T 403 (BASF), Polyetheramin T 5000 (BASF) or else corresponding Jeffamine types from Huntsman, piperazine, aminoethylpiperazine, bis(aminoethyl)piperazine, 1,3-diaminopropane, 3-(cyclohexylamino)propylamine, 3-(methylamino) propylamine, N,N-bis(3-aminopropyl)methylamine, (3-(2-aminoethylamino)propylamine), dipropylenetriamine, and N,N'-bis(3-aminopropyl)ethylenediamine.

Suitable hydroxylamines having at least one OH function are for example: ethanolamine, propanolamine, alkylethanolamines, arylethanolamine, alkylpropanolamine, for example: diethanolamine, monoethanolamine, diisopropanolamine, isopropanolamine, methylisopropanolamine, digylcolamine(2-(2-aminoethoxy)ethanol), dimethylethanolamine, N-(2-hydroxyethyl)aniline, 1-(2-hydroxyethyl) piperazine, 2-(2-aminoethoxy)ethanol, 3-amino-1-propanol, 5-amino-1-pentanol, butylethanolamine, ethylethanolamine, N-methyl-ethanolamine, aminopropylmonomethylethanolamine, 2-amino-2-methylpropanol, trishydroxymethylaminomethane (THMAM or TRIS), and N-(2-aminoethyl)ethanolamine (AEEA). It is also possible to use corresponding alkoxylates, more particularly ethoxylates and/or propoxylates of amines, for example alkylamines having a hydroxyethyl or hydroxypropyl unit or, for example, N-hydroxyethylcyclohexyldiamine, N-hydroxyethylisophoronediamine, N-hydroxyethylpiperazine, and bis(hydroxyethyl)toluenediamine.

Inventive amides of formula (I) can also be commercially available amides having OH or NH functions, for example from Evonik Goldschmidt: Rewomid® DC 212 S, Rewomid® DO 280 SE, Rewocid® DU 185 SE, Rewolub® KSM, REWOMID® C 212, REWOMID® IPP 240, REWOMID® SPA, Rewopon® IM AO, Rewopon® IM AN or Rewopon® IM R 40 and also DREWPLAST® 154, NINOL® 1301, NINOL® 40-CO, NINOL® 1281, NINOL® COMF, NINOL® M-10 and ethoxylated diethanolamides such as NINOL® C-41, NINOL® C-5, NINOL® 1301 from Stepan or DACAMID® MAL and DACAMID® DC from Sasol.

In one preferred embodiment of the invention, the amidation is carried out with a deficiency of amine, and so there is ideally little if any free amine present in the end product. Since amines generally do not have advantageous toxicological properties due to their irritating or caustic effect, any minimization of amine fractions is desirable and advantageous. Preferably, the amine fractions in the admixture used according to the invention, more particularly the fractions attributable to compounds bearing primary and secondary amine groups, are less than 5% by weight, more preferably below 3% by weight, and even more preferably less than 1% by weight based on the sum total of amines and amides.

The amide of formula (I) is preferably a compound of formula (II)

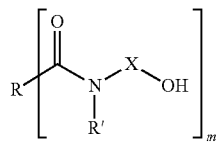

(II)

where m, R, R' and X are each as defined above.

Preferably the inventive composition contains by way of amide of formula (I) at least one compound of formula (III)

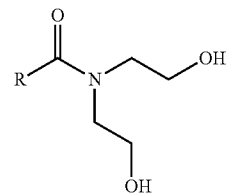

(III)

where R is as defined above, the amide of formula (III) preferably being obtained by reacting a fatty acid with diethanolamine The proportion of amides of formula (I) is preferably in the range from 0.05 to 10 parts by mass, more preferably in the range from 0.1 to 8 parts by mass, even more preferably in the range from 0.25 to 5 parts by mass, and yet even more preferably in the range from 0.5 to 3 parts by mass, based on 100 parts by mass of polyol components.

The proportion of the inventive composition which is attributable to the admixture is preferably from above 0.05 to 20 parts by mass, more preferably from 0.2 to 10 parts by mass, and even more preferably from 0.5 to 5 parts by mass, based on 100 parts by mass of polyol components.

The admixture in the inventive composition preferably contains at least one siloxane compound containing at least one organic radical having at least two carbon atoms which is bonded to a silicon atom through an Si—C bond. It is preferable for at least 50% by weight, more preferably for at least 95% by weight, based on the siloxane compounds present in the admixture, and even more preferably for all the siloxane compounds present in the admixture to be such containing at least one organic radical having at least two carbon atoms which is bonded to a silicon atom through an Si—C bond.

Preferred siloxane compounds, more particularly those containing at least one organic radical having at least two carbon atoms which is bonded to a silicon atom through a Si—C bond, are selected from the polysiloxanes, organomodified polysiloxanes, polyether-modified polysiloxanes and polyether-polysiloxane copolymers.

As siloxanes there may be used for example the substances mentioned in the prior art. Preference is given to using such siloxanes which are suitable for the particular foam types (rigid foams, hot-cure flexible foams, viscoelastic foams, ester foams, HR foams, semi-rigid foams). Suitable siloxanes are described for example in the following documents: EP 1873209, EP 1544235, DE 10 2004 001 408, EP 0839852, WO 2005/118668, U.S. Patent Application Publication No. 20070072951, DE 2533074, EP 1537159, EP 533202, U.S. Pat. No. 3,933,695, EP 0780414, DE 4239054, DE 4229402, and EP 867464. The siloxanes can be prepared as described in the prior art. Particularly suitable examples of preparation are described for example in U.S. Pat. No. 4,147,847, EP 0493836 and U.S. Pat. No. 4,855,379.

Preference is given to the use of siloxanes in the inventive admixture that, in addition to the lateral polyether modifications, are also organomodified at some at least of the terminal siloxane units by bearing polyether groups. This structural type is described in EP 1873209 and can be represented by formula (IV) described hereinbelow.

It is particularly preferable for the admixture to include by way of siloxane compound at least one compound of formula (IV),

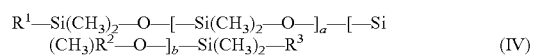

(IV)

where $R^2$ in each occurrence is the same or different and is —$(CH_2)_x$—O—$(CH_2$—$CHR^4$—$O)_y$—$R^5$ or a $C_8$ to $C_{22}$ alkyl radical, $R^1$ and $R^3$ in each occurrence are the same or different and is —$CH_3$ or $R^2$, provided at least one $R^1$ or $R^3$ radical is equal to $R^2$, a+b+2=10 to 150, preferably 25 to 120, b=0 to 25, preferably 0.5 to 15, x=3 to 10, preferably 3, y=1 to 30, preferably 5 to 25, $R^4$ in each occurrence is the same or different and is H, —$CH_3$, —$CH_2CH_3$ or phenyl, $R^5$ in each occurrence is the same or different and is H, alkyl or acyl, preferably H, $CH_3$ or $COCH_3$.

It can be advantageous for the admixture to include siloxane compounds of formula (IV) where at least 50 mol % of the $R^4$ radicals are H and preferably at least 90 mol % of the $R^4$ radicals are H. It can also be advantageous for the admixture to include siloxane compounds of formula (IV) where at least 5 mol % of the $R^4$ radicals are methyl and preferably at least 10 mol % of the $R^4$ radicals are methyl. Preference is given to including in the admixture such siloxane compounds of formula (IV) wherein at least 50 mol % of the $R^4$ radicals are H and wherein at least 10 mol % of the $R^4$ radicals are methyl. It is more preferable to include in the admixture such siloxane compounds of formula (IV) wherein at least 90 mol % of the $R^4$ radicals are H and at least 5 mol % of the $R^4$ radicals are methyl.

Particular preference is given to including in the admixture such siloxane compounds of formula (IV) wherein at least 5 mol % of the $R^5$ radicals are alkyl or acyl radicals, preferably $CH_3$ or $COCH_3$ radicals and more preferably methyl radicals.

It can be advantageous for siloxane compounds of formula (IV) in the admixture to contain the preferred $R^4$ and $R^5$ radicals in the mole percent ranges indicated above.

In particularly preferred siloxane compounds of formula (IV) in the admixture, the a/b ratio is above 7, preferably above 8 and more preferably above 10.

It can be advantageous for at least 10 equivalence % (and at most 50 equivalence %) of the $R^2$ radicals in the siloxane compounds of formula (IV) in the admixture to be alkyl groups having 8 to 22 carbon atoms (based on the total number of $R^2$ radicals in the siloxane compound).

The present invention compositions preferably include from 0.05 to 10 parts by mass, more preferably from 0.1 to 7.5 and even more preferably from 0.25 to 0.5 parts by mass of the abovementioned silicon compounds per 100 parts by mass of polyol components.

It can be advantageous for the amides of formula (I) to be used as solvents in the process for preparing the silicon compounds to be used in the composition, which is usually a hydrosilylation process. In this way, an additional separating step and/or the introduction of unwanted solvents into the compositions of the present invention is avoided.

By way of isocyanate component, the composition according to the invention may include any isocyanate compound suitable for producing polyurethane foams, more particularly rigid polyurethane or polyisocyanurate foams. Preferably the composition according to the invention includes one or more organic isocyanates having two or more isocyanate functions. A suitable isocyanate for the purposes of this invention is any polyfunctional organic isocyanate, for example 4,4'-diphenylmethane diisocyanate (MDI), toluene diisocyanate (TDI), hexamethylene diisocyanate (HMDI) and isophorone diisocyanate (IPDI). Of particular suitability is the mixture of MDI and more highly condensed analogs having an average functionality of 2 to 4 which is known as "polymeric MDI" ("crude MDI"). Examples of suitable isocyanates are mentioned in EP 1 712 578 A1, EP 1 161 474, WO 058383 A1, U.S. Patent Application Publication No. 2007/0072951 A1, EP 1 678 232 A2 and WO 2005/085310.

The polyol component is preferably different from the amide compounds of formula (I) and the siloxane compounds in the admixture. A suitable polyol for the purposes of this invention is any organic substance having two or more isocyanate-reactive groups and also any preparation thereof. Any polyether polyol or polyester polyol customarily used for producing polyurethane foams is preferred. Polyether polyols are obtained by reacting polyhydric alcohols or polyfunctional amines with alkylene oxides. Polyester polyols are based on esters of polybasic carboxylic acids (usually phthalic acid or terephthalic acid) with polyhydric alcohols (usually glycols). Polyols commensurate to the stipulated properties of the foams are used, as described for example in: U.S. Patent Application Publication No. 2007/0072951 A1, WO 2007/111828 A2, U.S. Patent Application Publication No. 2007/0238800, U.S. Pat. No. 6,359,022 B1 or WO 96 12759 A2. Similarly, vegetable oil-based polyols which are preferably usable are described in various documents, for example in WO 2006/094227, WO 2004/096882, U.S. Patent Application Publication No. 2002/0103091, WO 2006/116456 and EP 1 678 232.

When the inventive composition includes one or more isocyanates, the ratio of isocyanate to polyol, known as the index, is preferably in the range from 80 to 500 and more preferably in the range from 100 to 350. The index in effect describes the ratio of isocyanate actually used (for a stoichiometric reaction with polyol) to computed isocyanate. An index of 100 represents a molar ratio of 1:1 for the reactive groups.

By way of catalyst catalyzing the formation of a urethane or isocyanurate bond, the composition of the present invention preferably includes one or more catalysts suitable for the reactions of isocyanate-polyol and/or isocyanate-water and/or isocyanate trimerization. Suitable catalysts for the purposes of this invention are preferably catalysts catalyzing the gel reaction (isocyanate-polyol), the blowing reaction (isocyanate-water) and/or the di- or trimerization of the isocyanate. Examples of suitable catalysts are the amines triethylamine, dimethylcyclohexylamine, tetramethylethylenediamine, tetramethylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl)ether, tin compounds such as dibutyltin dilaurate and potassium salts such as potassium acetate and potassium 2-ethylhexanoate. Suitable catalysts are mentioned for example in EP 1985642, EP 1985644, EP 1977825, U.S. Patent Application Publication No. 2008/0234402, EP 0656382 B1, U.S. Patent Application Publication No. 2007/0282026 A1 and the patent documents cited therein.

Preferred catalyst quantities in the composition of the present invention depend on the type of catalyst and typically range from 0.05 to 5 pphp (=parts by mass per 100 parts by mass of polyol) or from 0.1 to 10 pphp for potassium salts.

By way of optional blowing agent, the composition of the present invention may include water or some other chemical or physical blowing agent. When water is used as blowing agent, suitable water contents for the purposes of this invention depend on whether or not one or more blowing agents are used in addition to the water. In the case of purely water-blown foams, the water contents are typically in the range from 1 to 20 pphp; when other blowing agents are used in addition, the use quantity is typically reduced to the range from 0.1 to 5 pphp. It is also possible to use a composition according to the invention that is completely free of water.

When blowing agents other than water are present in the composition of the present invention, these blowing agents other than water can be physical or chemical blowing agents. Preferably, the composition includes physical blowing agents. Suitable physical blowing agents for the purposes of this invention are gases, for example liquefied $CO_2$, and volatile liquids, for example hydrocarbons having 4 to 5 carbon atoms, preferably cyclopentane, isopentane and n-pentane, hydrofluorocarbons, preferably HFC 245fa, HFC 134a and HFC 365 mfc, hydrochlorofluorocarbons, preferably HCFC 141b, hydrofluoroolefins, oxygen-containing compounds such as methyl formate and dimethoxymethane, or hydrochlorocarbons, preferably 1,2-dichloroethane.

In addition to, or in place of, water and any physical blowing agents, it is also possible to use chemical blowing agents which react with isocyanates to evolve a gas, such as formic acid for example.

By way of additives, the compositions of the present invention may include further additives useful in the production of polyurethane foams. Flame retardants for example are frequently used additives.

The composition of the present invention may include any known flame retardant suitable for production of polyurethane foams. Suitable flame retardants for the purposes of this invention are preferably liquid organic phosphorus compounds, such as halogen-free organic phosphates, e.g., triethyl phosphate (TEP), halogenated phosphates, e.g. tris(1-chloro-2-propyl)phosphate (TCPP) and tris(2-chloroethyl)phosphate (TCEP) and organic phosphonates, e.g., dimethyl methanephosphonate (DMMP), dimethyl propanephosphonate (DMPP), or solids such as ammonium polyphosphate (APP) and red phosphorus. Useful flame retardants further include halogenated compounds, for example halogenated polyols, and also solids, such as expandable graphite and melamine.

By way of further additives, the composition may optionally also contain further components known according to the prior art, for example polyethers, nonylphenol ethoxylates, or nonionic surfactants.

The compositions of the present invention are useful for producing PU foams.

The inventive compositions can be used for example for producing polyurethane foams, more particularly rigid polyurethane foams. More particularly, the inventive compositions can be used in an inventive process for producing foamed polyurethane or polyisocyanurate materials (polyurethane foams), more particularly for producing rigid polyurethane foams, which are distinguished by an inventive composition being reacted.

The present invention process for producing polyurethane foams, more particularly rigid polyurethane foams, can be carried out according to the familiar methods, for example by manual mixing or preferably by means of foaming machines. When the process is carried out using foaming machines, high-pressure or low-pressure machines can be used. The process of the present invention can be carried out as both a batch operation and as a continuous operation.

A comprehensive review of the prior art, of the raw materials which can be used and of the processes which can be used is given in G. Oertel (ed.): "Kunststoffhandbuch", Volume VII, C. Hanser Verlag, Munich, 1983, in Houben-Weyl: "Methoden der organischen Chemie", Volume E20, Thieme Verlag, Stuttgart 1987, (3), pages 1561 to 1757, and in "Ullmann's Encyclopedia of Industrial Chemistry" Vol. A21, VCH, Weinheim, 4th edition 1992, pages 665 to 715.

Using the inventive composition in the production of rigid polyurethane foams provides the inventive polyurethane foams.

A preferred polyurethane or polyisocyanurate rigid foam formulation for the purposes of this invention would result in a foam density of 20 to 150 kg/m$^3$ and would have the composition mentioned in Table 1.

TABLE 1

Composition of a polyurethane or polyisocyanurate rigid foam formulation

| Component | Weight fraction |
| --- | --- |
| polyol | 100 |
| amine catalyst | 0.05 to 5 |
| potassium trimerization catalyst | 0 to 10 |
| polyether siloxane/amide admixture | 0.1 to 5 |
| water | 0.1 to 20 |
| blowing agent | 0 to 40 |
| flame retardant | 0 to 50 |
| isocyanate index: 80 to 500 | |

The inventive polyurethane foams, more particularly rigid polyurethane foams, include at least one amide compound according to formula (I) and at least one siloxane compound, each as defined above, the mass ratio of the at least one siloxane compound to the at least one compound of formula (I) (present in bound and/or unbound form) is above 1:10, preferably above 1:5, more preferably not less than 1:1, and even more preferably in the range from 1:1 to 5:1. Preferably, the inventive polyurethane foams, more particularly rigid polyurethane or polyisocyanurate foams, contain from 0.1% to 8% by mass, preferably from 0.2% to 5% by mass and more preferably from 0.5% to 3% by mass of compounds of formula (I) in bound and/or unbound form.

Inventive polyurethane foams, more particularly rigid polyurethane foams, are also distinguished in that they are obtainable by the process of the present invention.

Preferred inventive polyurethane foams, more particularly rigid polyurethane foams, which can be produced by using the inventive composition containing an admixture of amide and siloxane compound, have a thermal conductivity below 24 mW/m•K, and preferably below 23 mW/m•K.

The inventive polyurethane foams (foamed polyurethane or polyisocyanurate materials), more particularly rigid polyurethane foams, can be used as, or for producing, insulating materials, preferably insulating plates, refrigerators, insulating foams, vehicle seats, more particularly auto seats, roof liners, mattresses, filtering foams, packaging foams or spray foams.

The refrigerating apparatuses according to the present invention include a polyurethane foam (foamed polyurethane or polyisocyanurate material) according to the present invention, more particularly rigid polyurethane foam, as an insulating material.

The examples which follow describe the present invention by way of example without any intention to restrict the invention, the scope of which is apparent from the entire description and the claims, to the embodiments mentioned in the examples.

EXAMPLES

Example 1

Preparing the Amides

Example 1a

Amide 1

Under nitrogen, 245 g of soya oil and 26.4 g of diethanolamine were admixed with 0.3 g of sodium methoxide and stirred at 90° C. for 5 h. Then, 6.3 g of Polyvest® OC 800 S (addition product obtained from polybutadiene and maleic anhydride, available from Evonik Degussa GmbH) were added, followed by stirring at 80° C. for 1 h, to obtain a clear yellowish product.

Example 1b

Amide 2

Under nitrogen, 235 g of soya oil and 42 g of diethanolamine were admixed with 0.6 g of sodium methoxide and stirred at 90° C. for 5 h. Then, 3.8 g of ricinoleic acid were added, followed by stirring at 80° C. for 1 h, to obtain a clear yellowish product.

Example 1c

Amide 3

Rewocid DU 185 SE from Evonik Goldschmidt GmbH was used as commercially available diethanolamide.

Example 1d

Amide 4

Rewomid® DO 280 SE from Evonik Goldschmidt was used as another commercially available diethanolamide.

Example 2

Preparation of Siloxane Compounds

Siloxanes of formula (IV) were prepared as described in EP 1873209. The indices and radicals reported in Tables 2 and 3 relate to the above-indicated formula (IV). Table 2 indicates the construction of the $R^2$ radicals. The compounds of formula (IV) were accordingly prepared using the unsaturated allyl polyether or alkene compounds derived from the $R^2$ radical.

TABLE 2

Structures of $R^2$ radicals designated A to G

| $R^2$ | $R^4$ | $R^5$ | x | y |
|---|---|---|---|---|
| A | 35 mol % Me; 65 mol % H | H | 3 | 23 |
| B | 38 mol % Me; 62 mol % H | Me | 3 | 23 |
| C | 20 mol % Me; 80 mol % H | Me | 3 | 17 |
| D | 100 mol % H | Me | 3 | 13 |
| E | 25 mol % Me; 75 mol % H | H | 3 | 13 |
| F | 20 mol % Me; 80 mol % H | H | 3 | 25 |
| G |  | $C_{16}H_{33}$ | 0 | 0 |

The siloxane compounds of formula (IV) which are indicated in Table 3 were prepared using the unsaturated allyl polyether or alkene compounds derived from the different $R^2$ radicals.

TABLE 3

Summary of siloxane structures:

| Siloxane | $R^1$ | $R^3$ | $R^2$ | a | b |
|---|---|---|---|---|---|
| 1 | $R^2$ | $R^2$ | 50 mol % A, 50 mol % B | 40 | 4 |
| 2 | $R^2$ | $R^2$ | 100 mol % E | 40 | 4 |
| 3 | Me | Me | 50 mol % A, 50 mol % F | 25 | 2 |
| 4 | $R^2$ | $R^2$ | 70 mol % D, 30 mol % E | 20 | 0.5 |
| 5 | Me | Me | 70 mol % C, 30 mol % E | 52 | 8 |
| 6 | $R^2$ | $R^2$ | 70 mol % F, 30 mol % G | 60 | 8 |
| 7 | Me | Me | 100 mol % A | 25 | 2 |

Example 3

Preparation of Admixtures

Inventive admixtures of amides and siloxanes were prepared for the foaming tests. Admixtures with the prior art admixed components were also prepared, for comparative tests. The admixtures were prepared by simply adding the components together and then stiffing for 5 minutes. The compositions of the admixtures are reported in Table 4.

The comparative examples utilized the following substances as typical representatives of non-amidic compounds:
A) nonylphenol+8E0: reaction product of nonylphenol with 8 mol of ethylene oxide per OH function, commercially available, for example as Arkopal® N 080 from Clariant.
B) castor oil, commercially available, for example from Alberding+Boley, Krefeld.
C) PEG 400 dioleate, commercially available, for example as MARLOWET® 4702 from Sasol.

TABLE 4

Admixtures of organosiloxanes with amides (in parts by weight) used as foam stabilizers in Example 4

| Example | Organosiloxane | Admixed component |
|---|---|---|
| 3a | siloxane 1, 50 parts | amide 1, 50 parts |
| 3b | siloxane 1, 80 parts | amide 1, 20 parts |
| 3c | siloxane 1, 50 parts | amide 2, 50 parts |
| 3d | siloxane 1, 50 parts | amide 3, 50 parts |
| 3e | siloxane 1, 50 parts | amide 4, 50 parts |
| 3f | siloxane 2, 50 parts | amide 1, 50 parts |
| 3g | siloxane 2, 50 parts | amide 2, 50 parts |
| 3h | siloxane 2, 50 parts | amide 3, 50 parts |
| 3i | siloxane 3, 50 parts | amide 1, 50 parts |
| 3j | siloxane 4, 50 parts | amide 1, 50 parts |
| 3k | siloxane 5, 50 parts | amide 2, 50 parts |
| 3l | siloxane 6, 50 parts | amide 3, 50 parts |
| 3m | siloxane 7, 50 parts | amide 3, 50 parts |
| 3V1 | siloxane 1, 50 parts | A), 50 parts |
| 3V2 | siloxane 1, 50 parts | B), 50 parts |
| 3V3 | siloxane 1, 50 parts | C), 50 parts |
| 3V4 | siloxane 1, 80 parts | C), 20 parts |

Example 4

Foaming use Examples

The performance advantages over the prior art which are provided by using the inventive admixtures as foam stabilizers in polyurethane foams will now be demonstrated by means of use examples.

The foamings were carried out by the manual mixing method. For this purpose, polyol, catalyst(s), water, conventional or inventive foam stabilizer, as the case may be, and blowing agents were weighed into a beaker and mixed together using a plate stirrer (6 cm in diameter) at 1000 rpm for 30 s. The blowing agent quantity evaporated during mixing was determined by renewed weighing and replenished. Then, the isocyanate (MDI) was added, the reaction mixture was stirred with the described stirrer at 3000 rpm for 5 s and either foamed up in the beaker itself, in the case of the pour-in-place foaming, or, in the case of the other foamings, immediately transferred to a thermostatted aluminium mould lined with polyethylene film. Mold temperature and geometry varied with the foam formulation. The use quantity of foam formulation was determined such that it was 15% above the minimum amount needed to fill the mold.

One day after the foaming operation, the foamed materials were analyzed. In the case of the mold foams, surface and internal disruptions were likewise assessed subjectively on a scale from 1 to 10. The pore structure (average number of cells per cm) was assessed visually on a cut surface by comparison against comparative foams. The thermal conductivity coefficient ($\lambda$ value) was measured on discs 2.5 cm in thickness using an instrument of the Hesto Lambda Control type.

PUR Rigid Foam Systems for Insulation of Refrigerators

The two formulations optimized to this field of use and reported in Tables 5 and 7 were used and each foamed up with inventive foam stabilizers and non-inventive foam stabilizers. The reaction mixture was introduced into an aluminium mold 145 cm×14.5 cm×3.5 cm in size and thermostatted to 45° C.

TABLE 5

Fridge insulation formulation No. 1

| Component | Parts by weight |
|---|---|
| Daltolac ® R 471* | 100 parts |
| N,N-dimethylcyclohexylamine | 1.5 parts |
| water | 2.6 parts |
| cyclopentane | 13.1 parts |
| foam stabilizer | 1.5 parts |
| Desmodur ® 44V20L** | 198.5 parts |

*polyetherpolyol from Huntsman
**polymeric MDI from Bayer; 200 mPa*s; 31.5% NCO; functionality 2.7

The results shown in Table 6 below reveal that the inventive stabilizers consistently provide better surface qualities than the non-inventive, comparative stabilizers, which do not contain any inventive compounds (amides). Furthermore, the thermal conductivities are distinctly lower than those described in EP 767199.

TABLE 6

Fridge insulation results, system No. 1

| Ex. | Foam stabilizer of ex. | Defects (1-10) top/bottom/internal | Cells/cm$^{-1}$ | $\lambda$ value/mW/m · K |
|---|---|---|---|---|
| 4a | 3V1 | 5/4/5 | 35-39 | 22.6 |
| 4b | 3V2 | 5/4/4 | 35-39 | 22.6 |
| 4c | 3V3 | 5/4/4 | 35-39 | 22.8 |
| 4d | 3V4 | 6/4/5 | 35-39 | 22.5 |
| 4e | 3a | 7/5/6 | 40-44 | 22.2 |
| 4f | 3b | 8/5/7 | 40-44 | 21.8 |
| 4g | 3c | 6/4/5 | 40-44 | 22.4 |
| 4h | 3d | 7/5/6 | 40-44 | 22.2 |
| 4i | 3e | 7/4/6 | 40-44 | 22.3 |
| 4j | 3f | 7/5/7 | 40-44 | 22.0 |
| 4k | 3g | 7/4/7 | 40-44 | 22.2 |
| 4l | 3h | 7/6/6 | 40-44 | 22.1 |
| 4m | 3i | 7/5/7 | 40-44 | 22.3 |
| 4n | 3j | 7/4/6 | 40-44 | 22.2 |
| 4o | 3k | 6/5/5 | 40-44 | 22.4 |
| 4p | 3l | 7/6/6 | 40-44 | 22.1 |
| 4q | 3m | 7/5/7 | 40-44 | 22.2 |
| 4V1 | 3a | 5/4/5 | 35-39 | 24.1 |

Comparative Example 4V1 utilized an appropriately altered formulation No. 1 in that, as in EP 0767199, a higher proportion of fatty acid amide was used. In order that the ratio of acid amide to siloxane was 20:1 85 parts of Daltolac R 471, 15 parts of amide No. 3 and 1.5 parts of admixture 3a were used. The foam obtained in 4V1 had inferior surfaces and inferior thermal conductivity. The thermal conductivity values described in EP 0767199 are even higher at above 25 mW/m•K.

Table 7 describes a foam formulation in which a halogenated hydrocarbon combined with water is used as blowing agent.

TABLE 7

Fridge insulation formulation No. 2

| Component | Weight fraction |
|---|---|
| Daltolac ® R 471* | 60 parts |
| Voranol ® RN 490** | 40 parts |
| N,N-dimethylcyclohexylamine | 2.0 parts |
| Solkane 141b | 18 parts |
| Water | 2.0 parts |
| foam stabilizer | 2.0 parts |
| Desmodur ® 44V20L*** | 178 parts |

*polyetherpolyol from Huntsman
**polyether polyol from Dow
***polymeric MDI from Bayer The results shown in Table 8 reveal that the inventive stabilizers consistently provide better surface qualities than the non-inventive comparative stabilizers, which do not contain amides, even when a halogenated hydrocarbon is used as blowing agent instead of pentane.

TABLE 8

Fridge insulation system No. 2 results

| Ex. | Stabilizer of ex. | Defects (1-10) top/bottom/internal | Cells/cm$^{-1}$ | $\lambda$ value/mW/m · K |
|---|---|---|---|---|
| 4r | 3V1 | 6/5/6 | 35-39 | 22.6 |
| 4s | 3a | 8/6/8 | 35-39 | 22.6 |
| 4t | 3c | 8/7/8 | 35-39 | 22.8 |
| 4u | 3d | 8/8/8 | 35-39 | 22.5 |

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A composition for producing polyurethane foams, said composition comprising at least a polyol component, a catalyst catalyzing formation of a urethane or isocyanurate bond, and an admixture comprising at least one siloxane compound and at least one amide of formula (II)

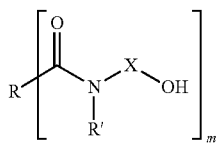
(II)

where
- R is an m-valent organic radical,
- R' in each occurrence is the same or different and represents H, a $C_1$-$C_{12}$ alkyl, aryl or alkylaryl, or a —X—Z radical,
- m=1 to 5,
- Z in each occurrence is the same or different and represents OH or NHR", where R"=H or alkyl, and
- X in each occurrence is the same or different and represents a divalent hydrocarbon radical having at least two carbon atoms, wherein the mass ratio of the at least one siloxane compound to the at least one amide of formula (II) is above 1:10, and wherein the proportion of the at least one amide of formula (II) is in the range from 0.1 to 10 parts by mass, based on 100 parts by mass of said polyol component.

2. The composition according to claim 1, wherein said at least one siloxane compound comprises at least one organic radical having at least two carbon atoms which is bonded to a silicon atom through a Si—C bond.

3. The composition according to claim 1, wherein the at least one siloxane compound comprises at least one compound of formula (IV)

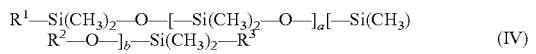
(IV)

where
- $R^2$ in each occurrence is the same or different and is —(CH$_2$)$_x$—O—(CH$_2$—CHR$^4$—O)$_y$—R$^5$ or a $C_8$ to $C_{22}$ alkyl radical,
- $R^1$ and $R^3$ in each occurrence are the same or different and is —CH$_3$ or $R^2$, provided at least one $R^1$ or $R^3$ radical is equal to $R^2$,
- a+b+2=10 to 150,
- b=0 to 25,
- x=3 to 10,
- y=1 to 30,
- $R^4$ in each occurrence is the same or different and is H, —CH$_3$, —CH$_2$CH$_3$ or phenyl, and
- $R^5$ in each occurrence is the same or different and is H, alkyl or acyl.

4. The composition according to claim 3, wherein at least 50 mol % of the $R^4$ radicals are H.

5. The composition according to claim 3, wherein at least 5 mol % of the $R^4$ radicals are methyl.

6. The composition according to claim 3, wherein at least 5 mol % of the $R^5$ radicals are alkyl or acyl radicals.

7. The composition according to claim 1, wherein the mass ratio of the siloxane compound to the at least one amide of formula (II) is in the range from 1:1 to 5:1.

8. The composition according to claim 1 further comprising a blowing agent, additional additives, an isocyanate component or mixtures thereof.

9. A composition for producing polyurethane foams, said composition comprising at least a polyol component, a catalyst catalyzing formation of a urethane or isocyanurate bond, and an admixture comprising at least one siloxane compound and at least one amide compound of formula (III)

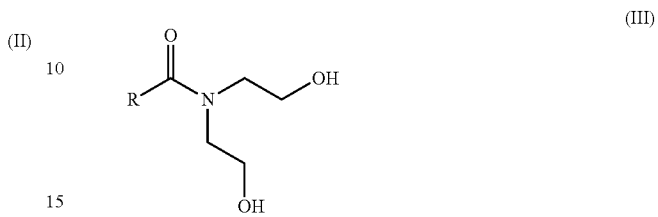
(III)

where R is an m-valent organic radical as defined above, and wherein the mass ratio of the at least one siloxane compound to the at least one amide of formula (III) is above 1:10, and wherein the proportion of the at least one amide of formula (III) is in the range from 0.1 to 10 parts by mass, based on 100 parts by mass of said polyol component.

10. A process for producing foamed polyurethane or polyisocyanaurate materials comprising reacting a composition comprising at least a polyol component, a catalyst catalyzing formation of a urethane or isocyanurate bond, and an admixture comprising at least one siloxane compound and at least one amide of formula (II)

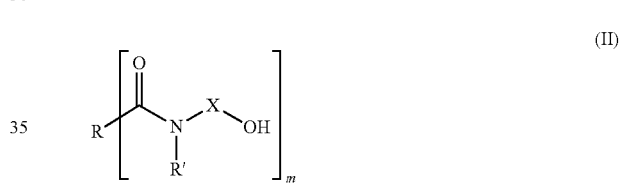
(II)

where
- R is an m-valent organic radical,
- R' in each occurrence is the same or different and represents H, a $C_1$-$C_{12}$ alkyl, aryl or alkylaryl, an organic radical or a —X—Z radical,
- m=1 to 5,
- Z in each occurrence is the same or different and represents OH or NHR", where R"=H or alkyl, and
- X in each occurrence is the same or different and represents a divalent hydrocarbon radical having at least two carbon atoms, wherein the mass ratio of the at least one siloxane compound to the at least one amide of formula (II) is above 1:10, and wherein the proportion of the at least one amide of formula (II) is in the range from 0.1 to 10 parts by mass, based on 100 parts by mass of said polyol component.

11. A polyurethane foam comprising at least one siloxane compound and at least one amide of formula (II)

(II)

where
- R is an m-valent organic radical,
- R' in each occurrence is the same or different and represents H, a $C_1$-$C_{12}$ alkyl, aryl or alkylaryl, an organic radical or a —X—Z radical,
- m=1 to 5,
- Z in each occurrence is the same or different and represents OH or NHR", where R"=H or alkyl, and
- X in each occurrence is the same or different and represents a divalent organic hydrocarbon radical having at least two carbon atoms, wherein the mass ratio of the at least one siloxane compound to the at least one amide of formula (II) is above 1:10, and wherein the proportion of the at least one amide of formula (II) is in the range from 0.1 to 10 parts by mass, based on 100 parts by mass of said polyol component.

12. An article of manufacturing comprising the polyurethane foam of claim 11 as an insulating material.

* * * * *